US010547603B2

(12) United States Patent
Gudivada et al.

(10) Patent No.: US 10,547,603 B2
(45) Date of Patent: Jan. 28, 2020

(54) SECURE CALL ANSWERING

(71) Applicant: QUALCOMM Incorporated, San Diego, CA (US)

(72) Inventors: Naga Chandan Babu Gudivada, Hyderabad (IN); Surendra Kompala, Hyderabad (IN); Anand Krishna Puranik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 15/630,687

(22) Filed: Jun. 22, 2017

(65) Prior Publication Data

US 2018/0375844 A1    Dec. 27, 2018

(51) Int. Cl.
*H04L 29/06* (2006.01)
*H04W 12/02* (2009.01)
*H04W 12/06* (2009.01)
*H04W 12/04* (2009.01)
*H04L 9/08* (2006.01)

(52) U.S. Cl.
CPC .............. *H04L 63/08* (2013.01); *H04L 63/04* (2013.01); *H04W 12/02* (2013.01); *H04W 12/06* (2013.01); *H04L 9/08* (2013.01); *H04W 12/04* (2013.01)

(58) Field of Classification Search
CPC ........... H04L 63/08; H04L 63/04; H04L 9/08; H04M 1/663; H04M 3/42059; H04M 3/436; H04W 12/02; H04W 21/04; H04W 12/06
USPC ........................................................ 380/270
See application file for complete search history.

(56) References Cited

U.S. PATENT DOCUMENTS 8,838,071 B1    9/2014  Cronin et al.
9,264,427 B2    2/2016  Amador et al.
9,460,334 B2    10/2016 Lan et al.
(Continued)

FOREIGN PATENT DOCUMENTS

WO          0115462 A1      3/2001

OTHER PUBLICATIONS

International Search Report and Written Opinion—PCT/US2018/036744—ISA/EPO—dated Oct. 29, 2018.

(Continued)

*Primary Examiner* — Michael S McNally
(74) *Attorney, Agent, or Firm* — Arent Fox, LLP

(57) ABSTRACT

In currently available mobile devices (e.g., a user equipment (UE)), no authentication occurs at the mobile device to answer an incoming call at the mobile device. In an aspect of the disclosure, a method, a computer-readable medium, and an apparatus for secure call answering are provided. The apparatus is a first UE. The apparatus receives an incoming call originated from a second UE. The apparatus determines whether the incoming call originated from the second UE is a secure incoming call. The apparatus also receives a secure authentication input upon determining that the incoming call is a secure incoming call. Further, the apparatus determines whether the secure authentication input matches with authentication information upon receiving the secure authentication input. Additionally, the apparatus answers the received secure incoming call originated from the second UE when the received secure authentication input matches the authentication information.

27 Claims, 7 Drawing Sheets

(56) References Cited

U.S. PATENT DOCUMENTS

| | | | | |
|---|---|---|---|---|
| 2002/0115425 | A1* | 8/2002 | Carter | H04M 1/72519 |
| | | | | 455/410 |
| 2004/0029564 | A1* | 2/2004 | Hodge | H04M 1/67 |
| | | | | 455/411 |
| 2011/0222688 | A1* | 9/2011 | Graham | H04L 63/0428 |
| | | | | 380/247 |
| 2011/0300829 | A1 | 12/2011 | Nurmi et al. | |
| 2012/0282921 | A1 | 11/2012 | Motola et al. | |
| 2013/0232335 | A1* | 9/2013 | King | H04L 63/062 |
| | | | | 713/155 |
| 2014/0133655 | A1* | 5/2014 | Kritt | H04W 12/02 |
| | | | | 380/270 |
| 2015/0120431 | A1 | 4/2015 | Arroyo-Figueroa et al. | |
| 2017/0126879 | A1 | 5/2017 | Krishna et al. | |

OTHER PUBLICATIONS

AppLock—Fingerprint Unlock, Cheetah Mobile (AppLock & AntiVirus) Tools, 2016, pp. 1-5.
"AppLock", DoMobile Lab Tools, 2016, pp. 1-4.

* cited by examiner

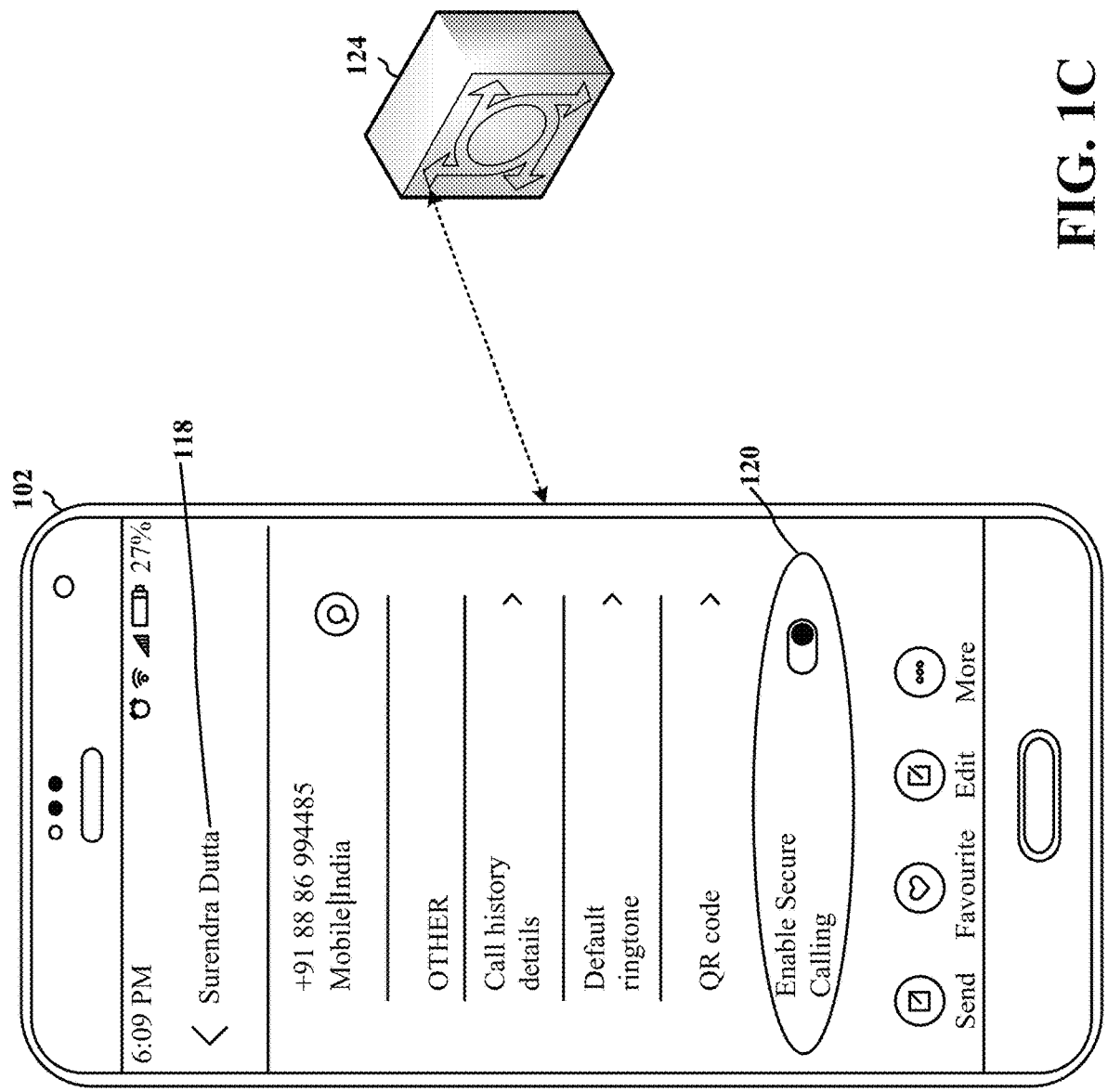

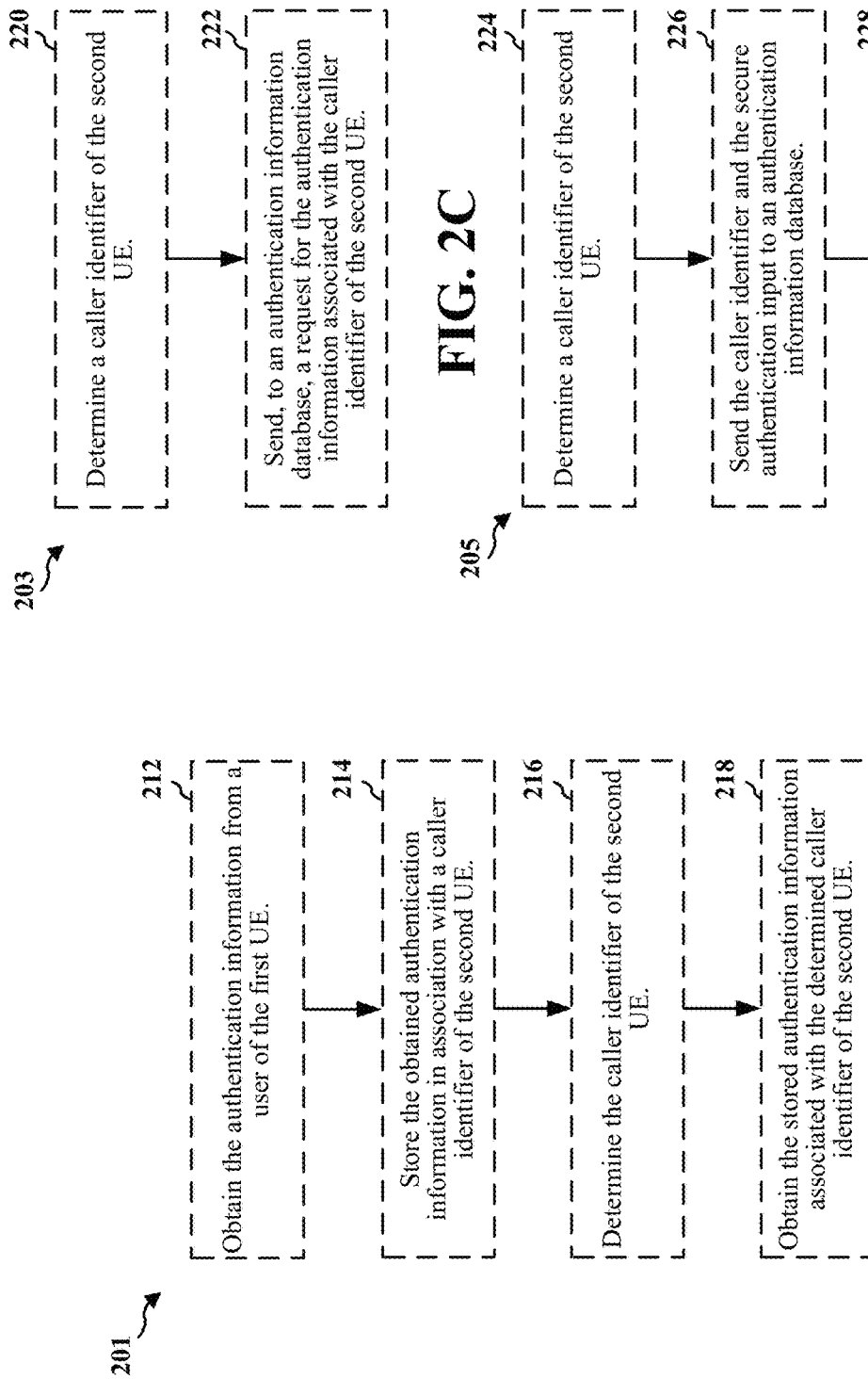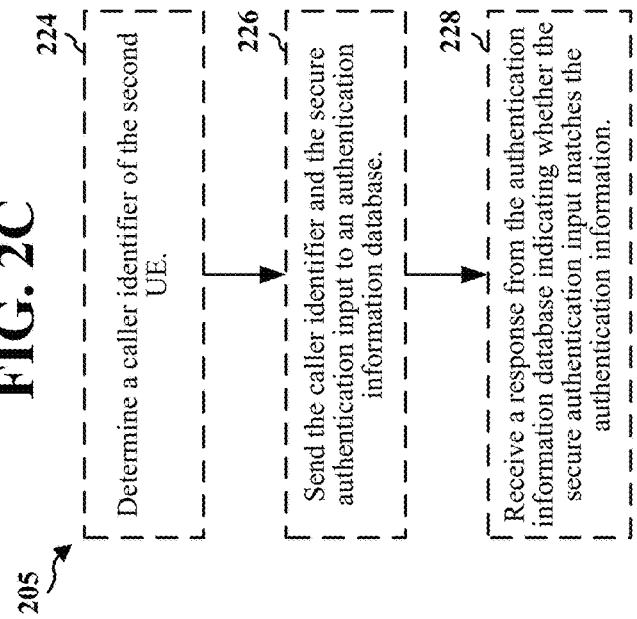

SECURE CALL ANSWERING

FIELD

The present disclosure relates generally to mobile devices, and more particularly, to a secure call answering feature in mobile devices.

BACKGROUND

In currently available mobile devices (e.g., a user equipment (UE), tablet, laptop, etc.), when an incoming call (circuit switched (CS)/packet switched (PS)) is received, anyone at the vicinity of the mobile device (e.g., a UE) may answer the call. In currently available technologies, no authentication occurs prior to answering an incoming call at the mobile device. In particular, anyone in the vicinity of the mobile device may answer an incoming call at the mobile device even when the person answering the call is not the device owner. In case of an incoming call containing sensitive information, for example, automated bank messages containing financial information intended to be heard only by the device owner, the incoming call may be received by someone other than the device owner. In such cases, the sensitive information specific to the device owner may be delivered to an unauthorized person over the unsecured phone call, if the unauthorized person receives the incoming phone call. Delivery of sensitive information to the unauthorized person receiving the incoming phone call may compromise the privacy and security of sensitive information of the device owner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In currently available mobile devices (e.g., a UE, tablet, laptop, etc.), when an incoming call (CS/PS) is received, anyone at the vicinity of the mobile device (e.g., a UE) may answer the call. In currently available technologies, no authentication occurs prior to answering an incoming call at the mobile device. In particular, anyone in the vicinity of the mobile device may answer an incoming call at the mobile device even when the person answering the call is not the device owner. In case of an incoming call containing sensitive information, for example, automated bank messages containing financial information intended to be heard only by the device owner, the sensitive information may be received by someone other than the device owner. In such cases, the sensitive information specific to the device owner may be delivered to an unauthorized person over the unsecured phone call, if the unauthorized person answers the incoming phone call. Delivery of such sensitive information to the unauthorized person answering the incoming phone call may compromise the privacy and security of sensitive information of the device owner. Therefore, there is a need for a secure call answering feature in the currently available mobile devices (e.g., a UE, tablet, laptop, etc.) to ensure privacy and information security of the device owner.

In an aspect of the disclosure, a method, a computer-readable medium, and an apparatus for secure call answering are provided. The apparatus is a first UE. The apparatus receives an incoming call originated from a second UE. The apparatus determines whether the incoming call originated from the second UE is a secure incoming call. The apparatus also receives a secure authentication input upon determining that the incoming call is a secure incoming call. Further, the apparatus determines whether the secure authentication input matches with authentication information upon receiving the secure authentication input. Additionally, the apparatus answers the received secure incoming call originated from the second UE when the received secure authentication input matches the authentication information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 1C is a yet another diagram illustrating a secure call answering at a UE.

FIG. 2B is a flowchart of a method of obtaining and storing the authentication information from a user of the UE, before receiving the secure incoming call.

FIG. 2C is a flowchart of a method of obtaining authentication information from a database.

FIG. 2D is a flowchart of a method of employing a database to authenticate the intended recipient of a secure call.

DETAILED DESCRIPTION

Figure 1A:
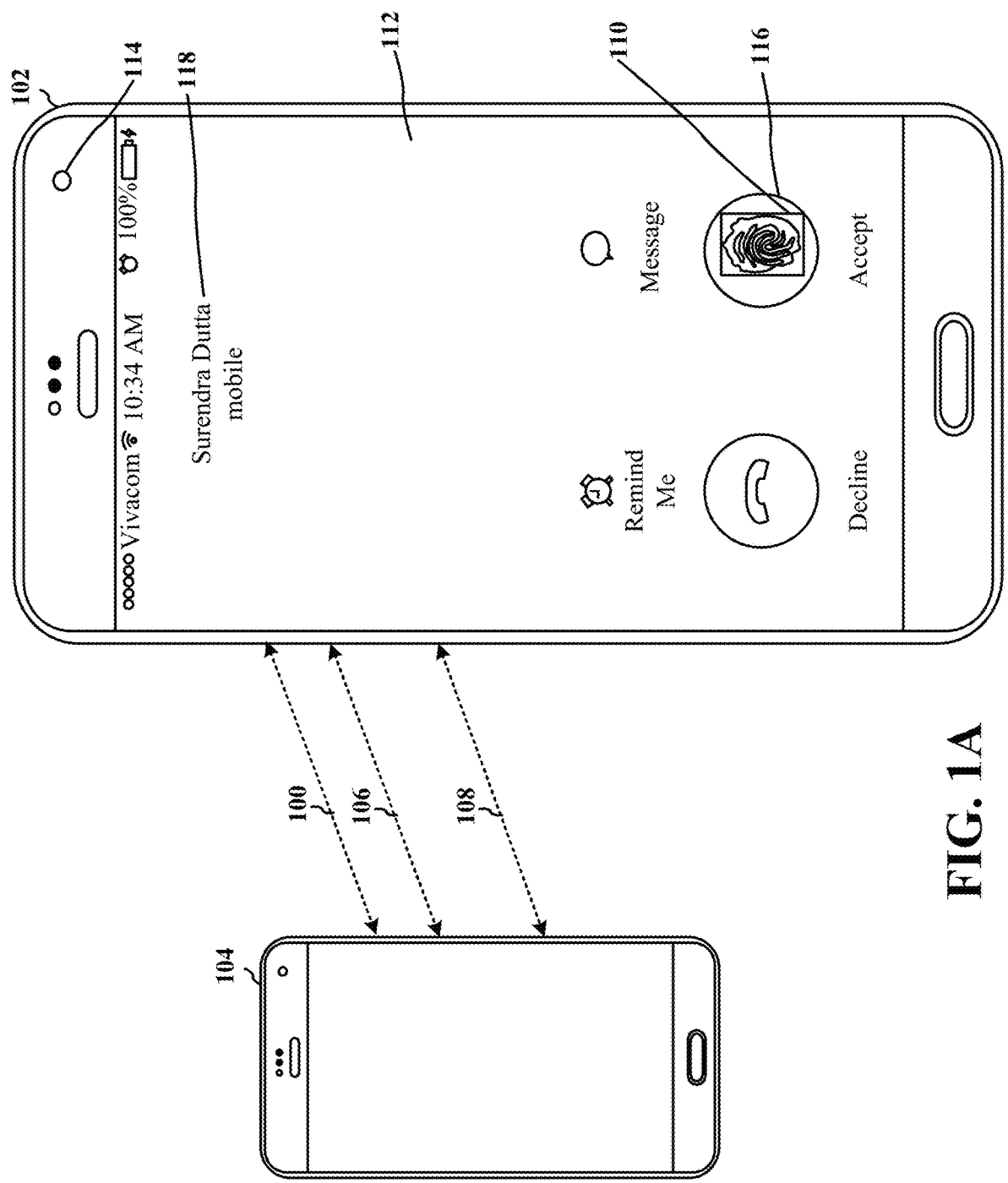
FIG. 1A is a diagram illustrating a secure call answering at a UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In currently available mobile devices (e.g., a UE, a tablet, a laptop, etc.), when an incoming call (CS/PS) is received, a person in the vicinity of the mobile device (e.g., a UE) may answer the call. In currently available technologies, no authentication occurs prior to answering the incoming call at the mobile device. In particular, anyone in the vicinity of the mobile device may answer the incoming call at the mobile device even though the person answering the call is not the device owner. In case of an incoming call containing sensitive information, for example, automated bank messages containing financial information intended to be heard only by the device owner, the incoming call may be answered by someone other than the device owner. In such cases, the sensitive information specific to the device owner may be delivered to an unauthorized person via the unsecured phone call, if the unauthorized person answers the incoming phone call. As a result, the privacy and security of sensitive information of the device owner may be compromised. In an aspect, a secure call answering feature may be provided in a mobile device (e.g., a UE, tablet, laptop, etc.) to ensure privacy and information security of the device owner.

In one configuration, a UE may be a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs may be referred to as Internet of things (IoT) devices (e.g., parking meter, gas pump, toaster, vehicles, etc.). The UE may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 1A is a diagram illustrating a secure call answering at a first UE 102. In one configuration, the first UE 102 may receive an incoming call 106 originated from a second UE 104. Upon receiving the incoming call 106 from the second UE 104, the first UE 102 may determine whether the incoming call 106 originated from the second UE 104 is a secure incoming call 106.

In an aspect, before receiving the secure incoming call 106, the first UE 102 may receive a notification 100 from the second UE 104 regarding the incoming call 106 being a secure incoming call 106. The first UE 102 may determine that the incoming call 106 originated from the second UE 104 is a secure incoming call 106 based on the notification 100 received from the second UE 104. In another configuration, once the secure call notification 100 is received at the first UE 102, the first UE 102 may store the phone number of the second UE 104, which originated the secure call notification 100, for a certain period of time (e.g., 5 mins). When an incoming call (e.g., incoming call 106) is received at the first UE 102 within the time allowed (e.g., 5 mins), the first UE 102 may determine whether such incoming call (e.g., incoming call 106) is a secure incoming call 106 by comparing the phone number of the incoming call (e.g., incoming call 106) with the stored phone number of the second UE 104 that originated the secure call notification 100. When the phone number of the incoming call (e.g., incoming call 106) matches the stored phone number of the second UE 104, the first UE 102 determines that the incoming call is a secure incoming call 106. Once the secure incoming call 106 is received at the first UE 102, the contact information 118 (e.g., name (e.g., Surendra Dutta), contact number, email address, home address, or the like) of the caller (e.g., owner of the second UE 104) may be visible at the touchscreen display 112 of the first UE 102, if the contact information 118 of the owner of the second UE 104 is saved at the first UE 102.

Figure 1B:
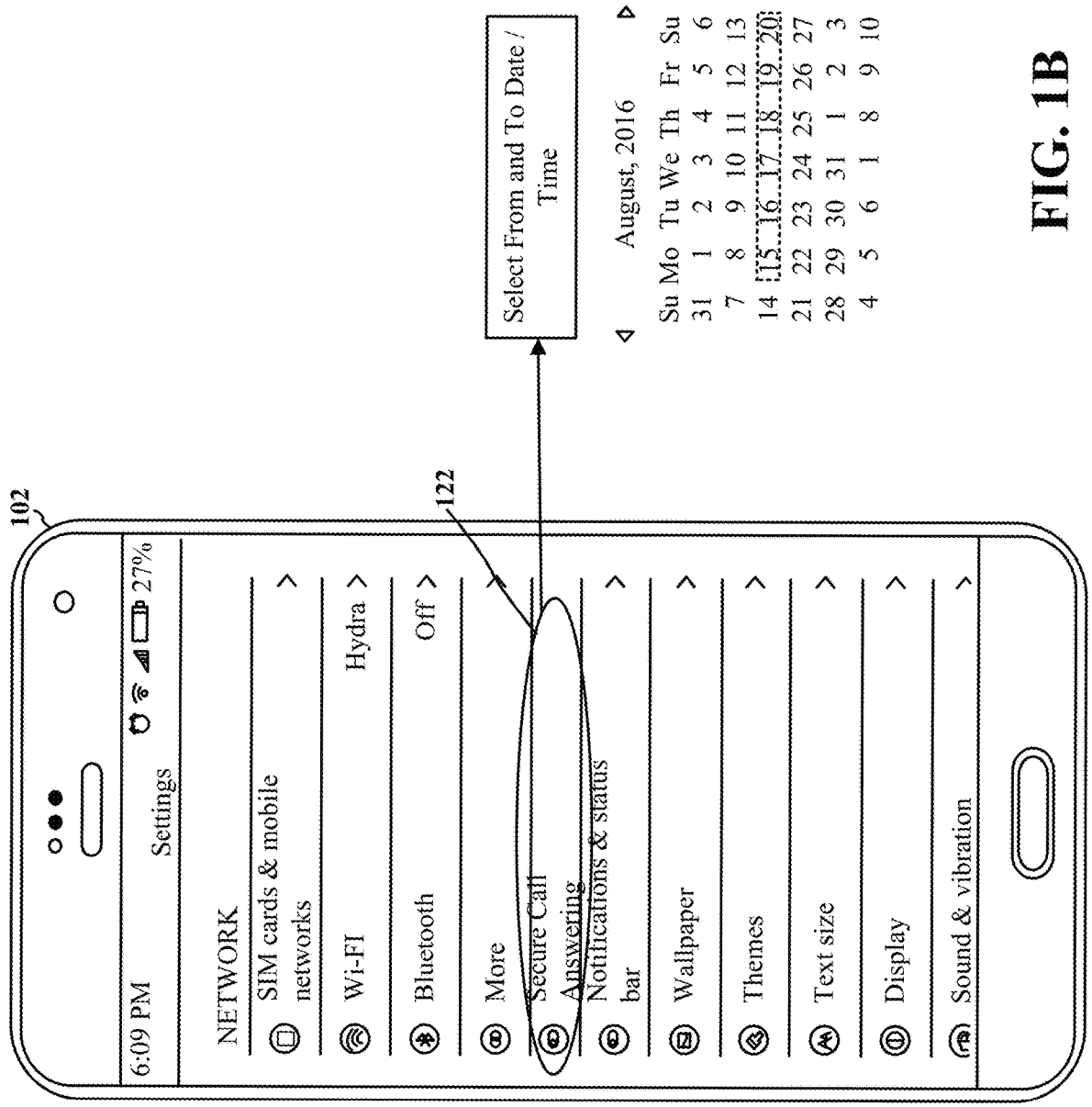
FIG. 1B is another diagram illustrating a secure call answering at a UE.

In some configurations, if a user (e.g., the owner of the first UE 102 or authorized friends or family members of the owner of the first UE 102) is expecting an incoming call containing sensitive information (e.g., an incoming call from a bank, a doctor's office, a social security office, or the like) during a particular time interval, a secure call answering 122 feature may be enabled via the settings of the user's mobile device (e.g., first UE 102) for all incoming calls received during the particular time interval. For example, as shown in FIG. 1B, if the owner of the first UE 102 or authorized friends or family members of the owner of the first UE 102, is/are expecting an incoming call containing sensitive information (e.g., an incoming call from a bank, doctor's office, social security office, or the like) anytime between 10:00 am, Aug. 15, 2016 to 12:00 pm, Aug. 20, 2016, a secure call answering 122 feature may be enabled via the settings of the first UE 102 for all incoming calls received between 10:00 am, Aug. 15, 2016 to 12:00 pm, Aug. 20, 2016. In another aspect, before receiving the secure incoming call 106 from the second UE 104, the first UE 102 may store a time period (e.g., 10:00 am, Aug. 15, 2016 to 12:00 pm, Aug. 20, 2016) associated with a caller identifier of the second UE 104. The caller identifier may include a name (e.g., Surendra Dutta), contact number, email address, home address, or the like, of the owner of the second UE 104, saved as a contact in the memory of the first UE 102.

In one configuration, as shown in FIG. 1C, the setting of the first UE 102 related to a particular contact 118 (e.g., the owner of the second UE 104) may be edited to enable secure calling for that particular contact 118 (e.g., the owner of the second UE 104) whose authentication information 108 (See, for example, FIG. 1A) is saved at the first UE 102. For example, as shown in FIG. 1C the secure calling feature for incoming/outgoing call to/from the contact Surendra Dutta at the first UE 102 may be enabled by enabling the secure call enable setting 120 at the first UE for that contact. In another configuration, the secure calling may be enabled for multiple contacts whose authentication information is saved at the first UE 102.

Returning back to FIG. 1A, in an aspect, upon determining that the incoming call 106 is a secure incoming call 106, an authentication prompt may appear at the touchscreen display 112 of the first UE 102 to prompt for the secure authentication input 110. For example, the prompt may prompt the person answering the secure incoming call 106 to input his/her fingerprint (e.g., secure authentication input 110) on the touchscreen display 112 of the first UE 102 and/or scan his/her iris using a camera device 114 embedded on the first UE 102. In one embodiment, the fingerprint of the person answering the secure incoming call 106 may be captured via the call accept button 116 of the touchscreen display 112 of the first UE 102, when a fingerprint scanner is incorporated into the call accept button 116.

In one configuration, the secure authentication input 110 may be a biometric information or a non-biometric information corresponding to the intended recipient (e.g., owner of the first UE 102 or authorized friends or family members of the owner of the first UE 102) of the secure call 106. The biometric information may be information related to the fingerprint of the intended recipient and/or the iris image of the intended recipient (e.g., owner of the first UE 102 or authorized friends or family members of the owner of the first UE 102) of the secure call 106. The non-biometric information may be a passcode (e.g., a public key/private key authentication, or the like).

In another aspect, before receiving the secure incoming call 106 from the second UE 104, the first UE 102 may obtain the authentication information 108 from a user of the first UE 102 (e.g., owner of the first UE 102) and store the obtained authentication information 108 associated with a caller identifier of the second UE 104. The authentication information 108 may include fingerprint information, eye information (e.g., an iris scan or a retina scan), an authentication passcode, or the like, obtained by the first UE 102. The caller identifier may include a name (e.g., Surendra Dutta), contact number, email address, home address, or the like, of the owner of the second UE 104, saved as a contact in the memory of the first UE 102. The first UE 102 may also determine the caller identifier of the second UE 104 upon receiving the secure incoming call 106 and obtain the stored authentication information 108 associated with the determined caller identifier of the second UE 104.

In an aspect, authentication information 108 may be a biometric information or a non-biometric information corresponding to the intended recipient (e.g., owner of the first UE 102 or authorized friends or family members of the owner of the first UE 102) of the secure incoming call 106 at the first UE 102. The biometric information may be information related to the fingerprint of the intended recipient and/or the iris image of the intended recipient (e.g., owner of the first UE 102) of the secure incoming call 106. The non-biometric information may be a passcode (e.g., a public key/private key authentication, or the like).

In another aspect, the authentication information 108 may be dynamic for a secure call originated from the second UE 104. For example, for each secure call originated from second UE 104 to first UE 102, different authentication information 108 may be generated by the second UE based on the biometric/iris information of the intended recipient (e.g., owner of the first UE 102) of the secure call 106 stored at the second UE 104. For example, the second UE 104 may use different fingerprint reference points of the intended recipient (e.g., owner of the first UE 102 or authorized friends or family members of the owner of the first UE 102) of the secure call 106, stored at the second UE 104, each time to generate different authentication information 108 for each secure call originated from second UE 104 to first UE 102.

In one configuration, at the time of saving a new contact information (or editing an existing contact information) at the first UE 102 or the second UE 104, the device (e.g., UE 102, UE 104) owner may save the authentication information 108 (e.g., fingerprint information, eye information (e.g., an iris scan or a retina scan), an authentication passcode, or the like) specific to the contact in the device memory.

In an aspect, the owner of the first UE 102 may determine authorized recipients for an incoming secure call 106. The authorized recipients may be different based on a caller identity. The authorized recipients may be the owner and or include one or more additional recipients authorized to answer the secure incoming call 106 at the first UE 102. The one or more additional recipients authorized to answer the secure incoming call 106 at the first UE 102 may be one or more friends or family members of the owner of the first UE 102. In such case, the authentication information 108 of each intended recipient of the one or more additional recipients may be stored in the first UE 102.

In another aspect, the caller (e.g., second UE 104) making the secure call 106 may determine the authorized recipient (e.g., owner of the first UE 102) of the secure call 106. In such case, before receiving the secure incoming call 106 from the second UE 104, the first UE 102 may receive an authentication information 108 (e.g., fingerprint information, eye information (e.g., an iris scan or a retina scan), an authentication passcode, or the like) from the second UE 104. In an aspect, the authentication information 108 (e.g., fingerprint information, eye information (e.g., an iris scan or a retina scan), an authentication passcode, or the like) may be saved in a memory of the second UE 104 or in a database in communication with the second UE 104. The notification 100 and the authentication information 108 (e.g., fingerprint information, eye information (e.g., an iris scan or a retina scan), an authentication passcode, or the like) may be received at the first UE 102 via a short message service (SMS).

In an aspect, to determine the authorized recipient (e.g., owner of the first UE 102) of the secure call 106 received during the time interval (e.g., 10:00 am, Aug. 15, 2016 to 12:00 pm, Aug. 20, 2016) when the secure call answering 122 feature is enabled (e.g., FIG. 1B), an authentication prompt may appear at the touchscreen display 112 of the first UE 102 for the secure authentication input 110. The prompt for authentication information may be prompt for a fingerprint, prompt for an iris scan, or prompt for a passcode. The captured authentication input 110 may be compared to the authentication information 108 of the owner of the first UE 102 or authorized friends or family members of the owner of the first UE 102 saved in a memory of the first UE 102. Therefore, all the incoming calls at the first UE 102 received during 10:00 am, Aug. 15, 2016 to 12:00 pm, Aug. 20, 2016 may be answered if the identity of the intended recipient (e.g., owner of the first UE 102 or authorized friends or family members of the owner of the first UE 102) of the incoming calls at the first UE 102 received during the time interval from 10:00 am, Aug. 15, 2016 to 12:00 pm, Aug. 20, 2016, is verified. In other words, all the incoming calls at the first UE 102 received from 10:00 am, Aug. 15, 2016 to 12:00 pm, Aug. 20, 2016 may be answered if the secure authentication input 110 received at the first UE 102 matches the authentication information 108 of the owner of the first UE 102 or authorized friends or family members of the owner of the first UE 102 saved in a memory of the first UE 102 or in a database 124 in communication with the first UE 102.

In another aspect, the first UE 102 may prompt the user of the first UE 102 to answer the secure incoming call 106 concurrently with the prompt of the user of the first UE 102 for the secure authentication input 110. In one configuration, the prompt for the secure authentication input 110 and the prompt to answer the secure incoming call 106 may appear at the touchscreen display 112 of the first UE 102.

In an aspect, the first UE 102 may provide the user authentication required for successfully answering the secure incoming call 106 originated from the second UE 104. In such case, upon determining that the incoming call 106 is a secure incoming call 106 and receiving the secure authentication input 110, the first UE 102 may determine whether the secure authentication input 110 received at the first UE 102 matches the authentication information 108 received from the second UE 104. The first UE 102 may answer the secure incoming call 106 originated from the second UE 104 when the received secure authentication input 110 matches the authentication information 108 received from the second UE 104. Otherwise, the first UE 102 does not allow the incoming call 106 to go through and subsequently the incoming call 106 is terminated by the second UE 104.

In another aspect, a database 124 (FIG. 1C) in communication with the first UE 102 and the second UE 104 may provide the user authentication required for successfully answering the secure call 106 at the first UE 102. The secure call 106 may be originated from the second UE 104. In such case, the second UE 104 may provide the authentication information 108 relating to the intended recipient (e.g., owner of the first UE 102 or authorized friends or family members of the owner of the first UE 102) of the secure call 106 to the database 124. Once the first UE 102 determines that the incoming call 106 is a secure incoming call 106 and receives the secure authentication input 110, the first UE 102 may send the received secure authentication input 110 to the database 124. The database 124 may return authenticated or not authenticated to the second UE 104 based on whether the secure authentication input 110 matches the authentication information 108 relating to the intended recipient of the secure call 106 at the first UE 102. If authenticated, the secure incoming call 106 is connected at the first UE 102. Otherwise, the secure call 106 is terminated by the second UE 104.

In yet another aspect, the second UE 104 may provide the user authentication required for successfully answering the secure call 106 at the first UE 102. The secure call 106 is originated from the second UE 104. In such case, once the first UE 102 determines that the incoming call 106 is a secure incoming call 106 and receives the secure authentication input 110, the first UE 102 may send the received secure authentication input 110 to the second UE 104 in which the authentication information 108 corresponding to the intended recipient (e.g., owner of the first UE 102 or authorized friends or family members of the owner of the first UE 102) of the secure call 106 at the first UE 102 is saved. The second UE 104 may compare the received the secure authentication input 110 from the first UE 102 with the authentication information 108 relating to the intended recipient of the secure call 106 saved at the second UE 104. If the secure authentication input 110 of the person answering the call at the first UE matches the authentication information 108 relating to the intended recipient of the secure call 106 or once the identity of the collie is confirmed to be the intended recipient (e.g., owner of the first UE 102 or authorized friends or family members of the owner of the first UE 102) of the secure call 106 at the first UE 102, the second UE 104 connects the secure call 106 with the first UE 102. Otherwise, the secure call 106, originated from the second UE 104, is terminated by the second UE 104.

In another aspect, a cloud server in communication with the first UE 102 and the second UE 104 may provide the user authentication required for successfully answering the secure call 106 at the first UE 102. The secure call 106 is originated from the second UE 104. In such case, the second UE 104 may store the authentication information 108 relating to the intended recipient (e.g., owner of the first UE 102 or authorized friends or family members of the owner of the first UE 102) of the secure call 106 at the cloud server. Once the first UE 102 determines that the incoming call 106 is a secure incoming call and receives the secure authentication input 110, the first UE 102 may send the received secure authentication input 110 to the cloud server. The cloud server may return authenticated or not authenticated based on whether the secure authentication input 110 matches the authentication information 108 relating to the intended recipient of the secure call 106 at the first UE 102. If authenticated, the secure call 106 originated from the second UE 104 is connected at the first UE 102. Otherwise, the secure call 106 originated from the second UE 104 is terminated by the second UE 104.

In yet another aspect, the second UE 104 may send an indication to the cloud server that it is originating a secure call 106 and provide the authentication information 108 relating to the intended recipient of the secure call 106 to the cloud server. In such case, when the first UE 102 receives the secure call 106 originated from the second UE 104, the first UE 102 may contact the cloud server by sending the secure authentication input 110 received at the first UE 102 and the second UE details (e.g., phone number of the second UE 104). The cloud server then compares the authentication information 108 relating to the intended recipient of the secure call 106 with the secure authentication input 110 received at the first UE 102. The cloud server may return authenticated or not authenticated based on whether the secure authentication input 110 matches the authentication information 108 relating to the intended recipient of the secure call 106 at the first UE 102. If authenticated, the secure call 106 originated from the second UE 104 is connected at the first UE 102. Otherwise, the secure call 106 originated from the second UE 104 is terminated by the second UE 104.

Figure 2A:
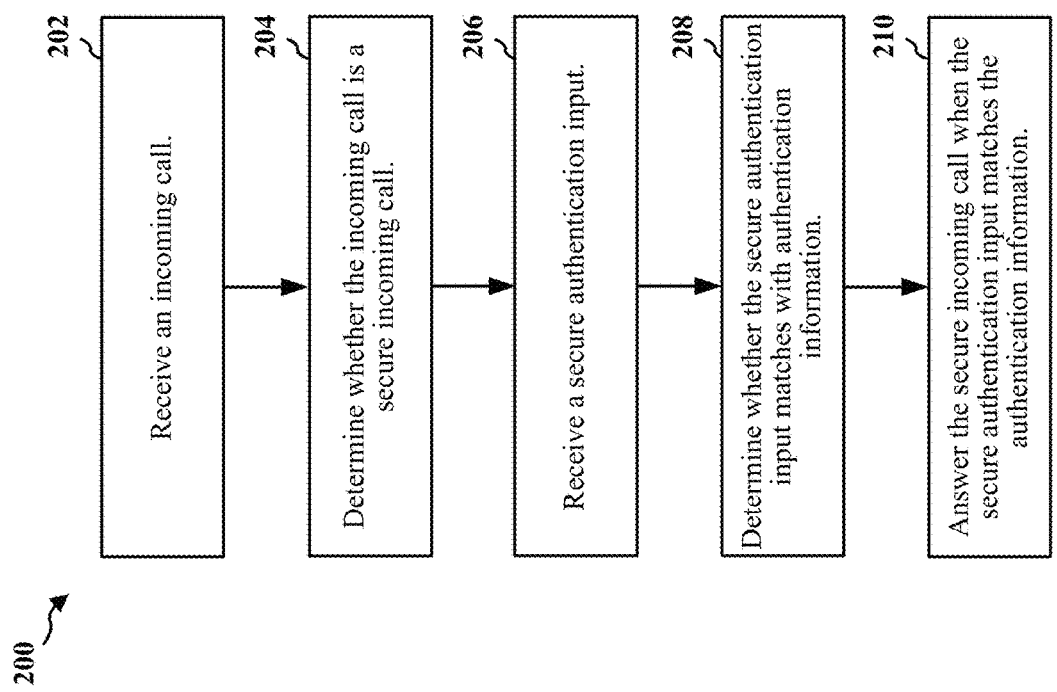
FIG. 2A is a flowchart of a method of secure call answering of a UE.

FIG. 2A is a flowchart 200 of a method of secure call answering of a UE, according to an aspect. The method may be performed by a UE (e.g., the first UE 102).

At 202, the first UE may receive an incoming call originated from a second UE. For example, the first UE 102 may receive an incoming call 106 originated from a second UE 104.

At 204, the first UE may determine whether the incoming call originated from the second UE is a secure incoming call. For example, the first UE 102 may determine whether the incoming call 106 originated from the second UE 104 is a secure incoming call 106.

In an aspect, to determine if the incoming call is a secure incoming call 106, the first UE 102 may determine if a notification 100 was received from the second UE 104 regarding the incoming call 106 being a secure incoming call 106. If a notification 100 was received at the first UE 102, the first UE 102 may determine if the incoming call is received within the time period during which the notification is valid (e.g., 5 mins). When the incoming call (e.g., incoming call 106) is received at the first UE 102 within the time allowed (e.g., 5 mins), the first UE 102 determines whether such incoming call (e.g., incoming call 106) is a secure incoming call 106 by comparing the phone number of the incoming call (e.g., incoming call 106) with the stored phone number of the second UE 104 that originated the secure call notification 100. If the phone number of the incoming call (e.g., incoming call 106) matches the stored phone number of the second UE 104, the first UE 102 determines that the incoming call is a secure incoming call 106. Once the incoming call is determined to be a secure incoming call 106, the contact information 118 (e.g., name (e.g., Surendra Dutta), contact number, email address, home address, or the like) of the caller (e.g., owner of the second UE 104) may be visible at the touchscreen display 112 of the first UE 102, if the contact information 118 of the owner of the second UE 104 is saved at the first UE 102.

In some configurations, to determine if the incoming call is a secure incoming call, the first UE 102 may determine if the secure call answering 122 feature is enabled via the settings of the mobile device (e.g., first UE 102) for all incoming calls received during a particular time interval. For example, when the secure call answering 122 feature is enabled via the settings of the first UE 102 for all incoming calls, the UE 102 determines if the incoming call is received during the time interval associated with the secure answering 122 feature. If the incoming call is within the time interval then the incoming call is a secure incoming call 106. Otherwise, the incoming call is not a secure incoming call 106. In another aspect, the first UE 102 may store the time period (e.g., 10:00 am, Aug. 15, 2016 to 12:00 pm, Aug. 20, 2016) associated with a caller identifier of the second UE 104. In an aspect, the first UE 102 may store different time intervals for secure incoming call from different callers whose contact information is saved at the first UE 102.

In one configuration, to determine if the incoming call is a secure incoming call, the UE 102 may check the contact information of the caller to determine if secure calling 120 is enabled. As shown in FIG. 1C, the setting of the first UE 102 related to a particular contact 118 (e.g., the owner of the second UE 104) may be edited to enable secure calling 120 for that particular contact 118 (e.g., the owner of the second UE 104) whose authentication information 108 is saved at the first UE 102. For example, as shown in FIG. 1C the secure calling feature for incoming/outgoing call to/from the contact 118 Surendra Dutta at the first UE 102 may be enabled by enabling the secure call enabling setting 120 at the first UE for that contact. In another configuration, the secure calling may be enabled for multiple contacts whose authentication information is saved at the first UE 102.

Returning back to FIG. 2A, at 206, the first UE may receive a secure authentication input upon determining that the incoming call is a secure incoming call. For example, the first UE 102 may receive a secure authentication input 110 (e.g., fingerprint authentication input or iris image authentication input, a public key/private key authentication, an authentication passcode, or the like) upon determining that the incoming call 106 is a secure incoming call 106.

In an aspect, as shown in FIG. 1A, upon determining that the incoming call 106 is a secure incoming call 106, an authentication prompt may appear at the touchscreen display 112 of the first UE 102 to prompt for the secure authentication input 110. For example, the prompt may prompt the person answering the secure incoming call 106 to input his/her fingerprint (e.g., secure authentication input 110) on the touchscreen display 112 of the first UE 102 and/or scan his/her iris using a camera device 114 embedded on the first UE 102. In one embodiment, the fingerprint of the person answering the secure incoming call 106 may be captured via the call accept button 116 of the touchscreen display 112 of the first UE 102, when a fingerprint scanner is incorporated into the call accept button 116.

In one configuration, the secure authentication input 110 may be a biometric information or a non-biometric information corresponding to the intended recipient (e.g., owner of the first UE 102 or authorized friends or family members of the owner of the first UE 102) of the secure call 106. The biometric information may be information related to the fingerprint of the intended recipient and/or the iris image of the intended recipient (e.g., owner of the first UE 102 or authorized friends or family members of the owner of the first UE 102) of the secure call 106. The non-biometric information may be a passcode (e.g., a public key/private key authentication, or the like).

At 208, the first UE may determine whether the secure authentication input matches with authentication information upon receiving the secure authentication input. For example, the first UE 102 may determine whether the secure authentication input 110 (e.g., fingerprint authentication input or iris image authentication input, a public key/private key authentication, an authentication passcode, or the like) matches with authentication information 108 (e.g., information related to the fingerprints or the iris images of the intended recipients, a public key/private key authentication, an authentication passcode, or the like) of the intended recipient upon receiving the secure authentication input 110.

At 210, the first UE may answer the received secure incoming call originated from the second UE when the received secure authentication input matches the authentication information. For example, the first UE 102 may answer the received secure incoming call 106 originated from the second UE 104 when the received secure authentication input 110 (e.g., fingerprint authentication input or iris image authentication input, a public key/private key authentication, an authentication passcode, or the like) matches the authentication information 108 (e.g., information related to the fingerprints or the iris images of the group of intended recipients, a public key/private key authentication, an authentication passcode, or the like).

FIG. 2B is a flowchart 201 of a method of obtaining and storing the authentication information from a user of the first UE, before receiving the secure incoming call, according to an aspect. The method may be performed by a UE (e.g., the first UE 102). Different blocks of the method of FIG. 2B may be optionally performed before block 202 of the method 200 of FIG. 2A.

Optionally, at 212, the first UE may obtain, before receiving the secure incoming call, the authentication information from a user of the first UE. For example, the authentication information 108 of the owner of the first UE 102 or an authorized user of the first UE 102 may be stored in the first UE 102. The authentication information 108 may be information related to the fingerprints or the iris images of the user of the first UE 102, a public key/private key authentication, an authentication passcode, or the like, obtained by prompting the user to input the requisite authentication data.

In one configuration, the first UE 102 may receive the authentication information 108 (e.g., information related to the fingerprints or the iris images of the intended recipient, a public key/private key authentication, an authentication passcode, or the like) from the second UE 104 before receiving the secure incoming call 106 from the second UE 104. For example, the caller (e.g., owner of the second UE 104) may be calling a phone number that is not the primary phone number of the intended recipient (e.g., owner of the first UE 102) of the call. In such a case, the second UE 104 may send the authentication information 108 of the intended recipient (e.g., owner of the first UE 102) to be used to authenticate the secure authentication input 110 obtained at the first UE 102.

In an aspect, authentication information 108 may be a biometric information or a non-biometric information corresponding to the intended recipient (e.g., owner of the first UE 102 or authorized friends or family members of the owner of the first UE 102) of the secure incoming call 106 at the first UE 102. The biometric information may be information related to the fingerprint of the intended recipient and/or the iris image of the intended recipient (e.g., owner of the first UE 102) of the secure incoming call 106. The non-biometric information may be a passcode (e.g., a public key/private key authentication, or the like).

In another aspect, the authentication information 108 may be dynamic for a secure call originated from the second UE 104. For example, for each secure call originated from second UE 104 to first UE 102, different authentication information 108 may be generated by the second UE based on the biometric/iris information of the intended recipient (e.g., owner of the first UE 102) of the secure call 106 at the first UE 102 stored at the second UE 104. For example, the second UE 104 may use different fingerprint reference points of the intended recipient (e.g., owner of the first UE 102 or authorized friends or family members of the owner of the first UE 102) of the secure call 106, stored at the second UE 104, each time to generate different authentication information 108 for each secure call originated from second UE 104 to first UE 102.

Optionally, at 214, the first UE may store, before receiving the secure incoming call, the obtained authentication information associated with a caller identifier of the second UE. For example, the first UE 102 may store, before receiving the secure incoming call 106, the obtained authentication information 108 (e.g., information related to the fingerprints or the iris images of the intended recipient, a public key/private key authentication, an authentication passcode, or the like) associated with a caller identifier (e.g., name (e.g., Surendra Dutta), contact number, email address, home address, or the like, of the owner of the second UE 104, saved as a contact in the memory of the first UE 102) of the second UE 104.

Optionally, at 216, the first UE may determine the caller identifier of the second UE upon receiving the secure incoming call. For example, the first UE 102 may determine the caller identifier (e.g., name (e.g., Surendra Dutta), contact number, email address, home address, or the like, of the owner of the second UE 104 saved as a contact in the memory of the first UE 102) of the second UE 104 upon receiving the secure incoming call 106 by matching the phone number of the secure incoming call 106 with a contact number stored in the memory of the first UE 102 and retrieving the associated information (e.g., information related to the fingerprints or the iris images of the intended recipient, a public key/private key authentication, an authentication passcode, or the like) related to that contact of the first UE 102.

Optionally, at 218, the first UE may obtain the stored authentication information associated with the determined caller identifier of the second UE. For example, the first UE 102 may obtain the stored authentication information 108 (e.g., information related to the fingerprints or the iris images of the intended recipient, a public key/private key authentication, an authentication passcode, or the like) associated with the determined caller identifier (e.g., name (e.g., Surendra Dutta), contact number, email address, home address, or the like, of the owner of the second UE 104, saved as a contact in the memory of the first UE 102) of the second UE 104 by matching the phone number of the secure incoming call 106 with a contact number stored in the memory of the first UE 102 and retrieving the associated authentication information 108 related to that contact of the first UE 102.

FIG. 2C is a flowchart 203 of a method of obtaining authentication information from a database, according to an aspect. The method may be performed by a UE (e.g., the first UE 102). Different blocks of the method of FIG. 2C may be optionally performed after block 204 of the method 200 of FIG. 2A.

Optionally, at 220, the first UE may determine a caller identifier of the second UE upon receiving the secure incoming call. For example, the first UE 102 may determine a caller identifier (e.g., name (e.g., Surendra Dutta), contact number, email address, home address, or the like, of the owner of the second UE 104, saved as a contact in the memory of the first UE 102) of the second UE 104 upon receiving the secure incoming call 106 by matching the phone number of the secure incoming call 106 with a contact number stored in the memory of the first UE 102 and retrieving the associated information related to that contact of the first UE 102.

Optionally, at 222, the first UE may send to an authentication information database, a request for the authentication information associated with the caller identifier of the second UE. The request may include the caller identifier of the second UE. For example, the authentication information 108 associated with the caller identifier of the second UE 104 may be stored in the database 124. The first UE 102 may send to the database 124, a request for the authentication information 108 (e.g., information related to the fingerprints or the iris images of the intended recipient, a public key/private key authentication, an authentication passcode, or the like) associated with the caller identifier (e.g., name (e.g., Surendra Dutta), contact number, email address, home address, or the like, of the owner of the second UE 104, saved as a contact in the memory of the first UE 102) of the second UE 104 from which the secure call 106 is originated. Once the authentication information 108 associated with the caller identifier of the second UE 104 is received from the database 124 at the first UE 102, the secure incoming call 106 may be answered by the intended recipient of the secure call 106 if the authentication information 108 associated with the caller identifier of the second UE matches the authentication information of the intended recipient of the secure call 106.

FIG. 2D is a flowchart 205 of a method of employing a database to authenticate the intended recipient of a secure call, according to an aspect. The method may be performed by a UE (e.g., the first UE 102). Different blocks of the method of FIG. 2C may be optionally performed after block 206 of the method 200 of FIG. 2A.

Optionally, at 224, the first UE may determine a caller identifier of the second UE upon determining that the incoming call is a secure incoming call. For example, the first UE 102 may determine a caller identifier (e.g., name (e.g., Surendra Dutta), contact number, email address, home address, or the like, of the owner of the second UE 104, saved as a contact in the memory of the first UE 102) of the second UE 104 of the secure incoming call 106. For example, the first UE 102 may determine a caller identifier (e.g., name (e.g., Surendra Dutta), contact number, email address, home address, or the like, of the owner of the second UE 104, saved as a contact in the memory of the first UE 102) of the second UE 104 of the secure incoming call 106 by matching the phone number of the secure incoming call 106 with a contact number stored in the memory of the first UE 102 and retrieving the associated information related to that contact of the first UE 102.

Optionally, at 226, the first UE may send the determined caller identifier and the received secure authentication input to an authentication information database. For example, the authentication information 108 relating to the secure incoming call 106 may be stored in the database 124. The first UE 102 may send the determined caller identifier (e.g., name (e.g., Surendra Dutta), contact number, email address, home address, or the like, of the owner of the second UE 104, saved as a contact in the memory of the first UE 102) and the received secure authentication input 110 (e.g., fingerprint or the iris image of the owner of the first UE 102, an authentication passcode, or the like, of the owner of the first UE 102) to an authentication information database 124.

Optionally, at 228, the first UE may receive a response from the authentication information database indicating whether the received secure authentication input sent to the database matches the authentication information associated with the caller identifier. For example, the first UE 102 may receive a response from the authentication information database 124 indicating whether the received secure authentication input 110 (e.g., fingerprint or the iris image of the owner of the first UE 102, an authentication passcode, or the like, of the owner of the first UE 102) matches the authentication information 108 stored in the database associated with the caller identifier (e.g., information related to the fingerprints or the iris images of the intended recipient, a public key/private key authentication, an authentication passcode, or the like).

In an aspect, before receiving the secure incoming call 106 from the second UE 104, the first UE 102 may store a time period (e.g., 10:00 am, Aug. 15, 2016 to 12:00 pm, Aug. 20, 2016) in association with a caller identifier of the second UE 104. In such case, an authentication prompt may appear at the touchscreen display 112 of the first UE 102 to prompt for the secure authentication input 110, upon determining that a current time (e.g., 1 pm, Aug. 16, 2016) corresponds with the stored time period (e.g., 10:00 am, Aug. 15, 2016 to 12:00 pm, Aug. 20, 2016) for the caller identifier of the second UE 104. In another aspect, an authentication prompt may appear at the touchscreen display 112 of the first UE 102 to answer the secure incoming call 106 at a same time prompting the user of the first UE 102 for the secure authentication input 110.

Figure 3:
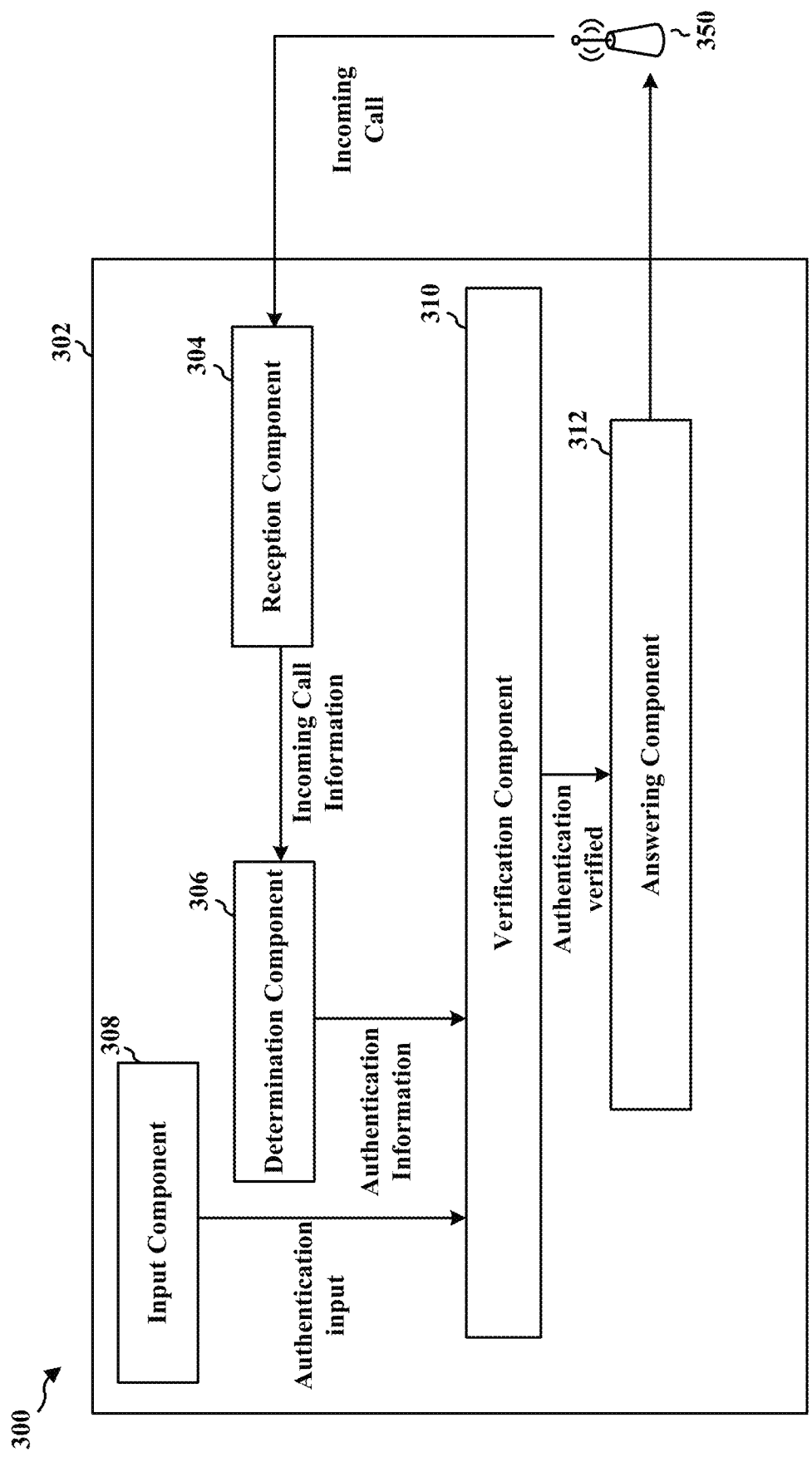
FIG. 3 is a conceptual data flow diagram illustrating the data flow between different means/components in an exemplary apparatus.

FIG. 3 is a conceptual data flow diagram 300 illustrating the data flow between different means/components in an exemplary apparatus 302. The apparatus may be a UE including a SIM, at least one processor and a memory coupled to the at least one processor or a modem including a MME, at least one processor fragment.

In an aspect, the apparatus 302 may include a reception component 304 that receives a notification (e.g., 100) of a secure incoming call (e.g., 106) along with an authentication information (e.g., 108) corresponding to the secure incoming call (e.g., 106). The reception component 304 may also receive an incoming call (e.g., 106) originated from another UE (e.g., second UE 104) via a base station 350. The apparatus 302 also includes a determination component 306 to determine if the incoming call (e.g., 106) originated from another UE (e.g., second UE 104) is a secure incoming call.

Further, the apparatus 302 may include an input component 308 that receives a secure authentication input (e.g., 110) in response to the secure incoming call (e.g., 106). The input component 308 may be a fingerprint scanner, iris scanner, or a keypad to capture passcode. Moreover, the apparatus 302 may include a verification component 310 to compare the secure authentication input (e.g., 110) with an authentication information corresponding to the secure call (e.g., 106). Additionally, the apparatus 302 may include an answering component 312 to answer the secure call (e.g., 106) originated from another UE (e.g., second UE 104) when the secure authentication input (e.g., 110) received at the apparatus 302 matches the authentication information corresponding to the secure incoming call (e.g., 106).

The apparatus 302 may include additional components that perform each of the blocks of the algorithm in the aforementioned flowchart 200 of FIG. 2A, 201 of FIG. 2B, 203 of FIG. 2C, and 205 of FIG. 2D. As such, each block in the aforementioned flowchart of FIGS. 2A, 2B, 2C, and 2D may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 4:
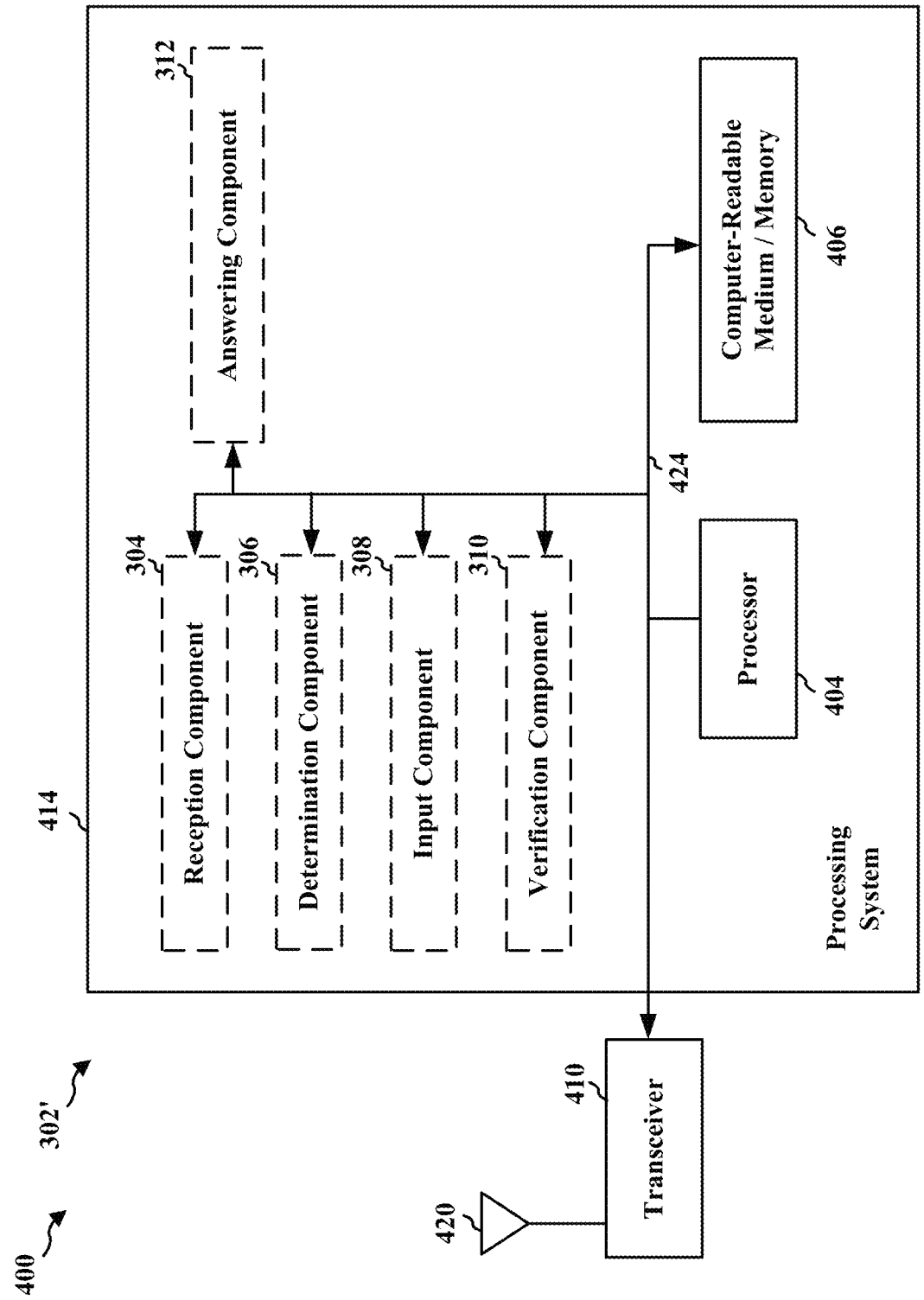
FIG. 4 is a diagram illustrating an example of a hardware implementation for an apparatus employing a processing system.

FIG. 4 is a diagram 400 illustrating an example of a hardware implementation for an apparatus 302' employing a processing system 414. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the reception component 304, the determination component 306, the input component 308, the verification component 310, the answering component 312, and the computer-readable medium/memory 406. The bus 424 may also link various other circuits such as timing sources, peripherals, voltage regulators, and power management circuits, which are well known in the art, and therefore, will not be described any further.

The processing system 414 may be coupled to a transceiver 410. The transceiver 410 is coupled to one or more antennas 420. The transceiver 410 provides a means for communicating with various other apparatus over a transmission medium. The transceiver 410 receives a signal from the one or more antennas 420, extracts information from the received signal, and provides the extracted information to the processing system 414, specifically the reception component 304. In addition, the transceiver 410 receives information from the processing system 414, and based on the received information, generates a signal to be applied to the one or more antennas 420.

The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system 414 further includes at least one of the reception component 304, the determination component 306, the input component 308, the verification component 310, and the answering component 312. The components may be software components running in the processor 404, resident/stored in the computer readable medium/memory 406, one or more hardware components coupled to the processor 404, or some combination thereof.

In one configuration, the apparatus 302/302' for wireless communication includes means for receiving an incoming call originated from a second UE. The apparatus 302/302' also includes means for determining whether the incoming call originated from the second UE is a secure incoming call. The means for receiving is further configured to receive a secure authentication input upon determining that the incoming call is a secure incoming call. Also, the means for determining is further configured to determine whether the secure authentication input matches with authentication information upon receiving the secure authentication input. The apparatus 302/302' further includes means for answering the received secure incoming call that originated from the second UE when the received secure authentication input matches the authentication information.

In an aspect, the means for receiving is further configured to receive the authentication information from the second UE before receiving the secure incoming call from the second UE. In another aspect, the apparatus 302/302' for wireless communication further includes means for obtaining the authentication information from a user of a first UE. The authentication information is obtained before receiving the secure incoming call. The apparatus 302/302' also includes means for storing the obtained authentication information in association with a caller identifier of the second UE. The authentication information is stored before receiving the secure incoming call. In one configuration, the means for determining is further configured to determine the caller identifier of the second UE upon receiving the secure incoming call. In another configuration, the means for obtaining is further configured to obtain the stored authentication information associated with the determined caller identifier of the second UE.

In one configuration, the apparatus 302/302' for wireless communication further includes means for obtaining the authentication information from a user of a first UE, said authentication information being obtained before receiving the secure incoming call. The apparatus 302/302' also includes means for storing the obtained authentication information in association with a caller identifier of the second UE. The authentication information is stored before receiving the secure incoming call. In an aspect, the means for determining is further configured to determine the caller identifier of the second UE upon receiving the secure incoming call. In another aspect, the means for obtaining is further configured to obtain the stored authentication information associated with the determined caller identifier of the second UE.

In an aspect, the means for determining is further configured to determine a caller identifier of the second UE upon receiving the secure incoming call. The apparatus 302/302' further includes means for sending, to an authentication information database, a request for the authentication information associated with the caller identifier of the second UE. In another aspect, the request includes the caller identifier of the second UE.

In one configuration, the means for determining is further configured to determine a caller identifier of the second UE upon receiving the secure incoming call. In another configuration, the apparatus 302/302' further includes means for sending the determined caller identifier and the received secure authentication input to an authentication information database. In an aspect, the means for receiving is further configured to receive a response from the authentication information database indicating whether the received secure authentication input matches the authentication information.

In an aspect, the apparatus 302/302' also includes means for prompting a user of a first UE for the secure authentication input. Additionally, the apparatus 302/302' includes means for storing a time period in association with a caller identifier of the second UE. The time period is stored before receiving the secure incoming call. In another aspect, the secure authentication input is prompted upon determining that a current time corresponds with the stored time period for the caller identifier of the second UE.

The aforementioned means may be one or more of the aforementioned components of the apparatus 302/302' and/or the processing system 414 of the apparatus 302/302' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of secure call answering of a first user equipment (UE), comprising:
   receiving an incoming call originated from a second UE;
   determining whether the incoming call originated from the second UE is a secure incoming call;
   prompting a user of the first UE for a secure authentication input upon determining that the incoming call is a secure incoming call;
   receiving the secure authentication input upon determining that the incoming call is a secure incoming call, wherein the secure authentication input indicates to the first UE to answer the secure incoming call;
   determining whether the secure authentication input matches with authentication information upon receiving the secure authentication input, wherein the authentication information is obtained from the first UE, a user of the first UE, or the second UE; and
   answering the received secure incoming call originated from the second UE when the received secure authentication input matches the authentication information.

2. The method of claim 1, further comprising receiving the authentication information from the second UE before receiving the secure incoming call from the second UE.

3. The method of claim 2, wherein the authentication information is received via a short message service (SMS) from the second UE.

4. The method of claim 1, further comprising:
   obtaining, before receiving the secure incoming call, the authentication information from a user of the first UE;
   storing, before receiving the secure incoming call, the obtained authentication information in association with a caller identifier of the second UE;
   determining the caller identifier of the second UE upon receiving the secure incoming call; and
   obtaining the stored authentication information associated with the determined caller identifier of the second UE.

5. The method of claim 1, further comprising:
   determining a caller identifier of the second UE upon receiving the secure incoming call; and
   sending, to an authentication information database, a request for the authentication information associated with the caller identifier of the second UE, the request including the caller identifier of the second UE.

6. The method of claim 1, further comprising:
   determining a caller identifier of the second UE upon receiving the secure incoming call;
   sending the determined caller identifier and the received secure authentication input to an authentication information database; and
   receiving a response from the authentication information database indicating whether the received secure authentication input matches the authentication information.

7. The method of claim 1, further comprising storing, before receiving the secure incoming call, a time period in association with a caller identifier of the second UE, wherein the secure authentication input is prompted upon determining that a current time corresponds with the stored time period for the caller identifier of the second UE.

8. The method of claim 1, further comprising storing, before receiving the secure incoming call, information indicating whether call authentication is enabled for a caller identifier of the second UE, wherein the secure authentication input is prompted upon determining that call authentication is enabled for the caller identifier of the second UE.

9. The method of claim 1, further comprising prompting the user of the first UE to answer the secure incoming call at a same time when prompting the user of the first UE for the secure authentication input.

10. The method of claim 9, wherein the prompting for the secure authentication input and to answer the secure incoming call is indicated at a screen of the first UE while indicating that the secure incoming call is being received.

11. The method of claim 1, wherein the secure authentication input and the authentication information are at least one of biometric information or non-biometric information.

12. The method of claim 11, wherein the biometric information is at least one of a fingerprint or an iris scan input.

13. The method of claim 11, wherein the non-biometric information is a passcode.

14. An apparatus for secure call answering, the apparatus being a first user equipment (UE) comprising:
   means for receiving an incoming call originated from a second UE;
   means for determining whether the incoming call originated from the second UE is a secure incoming call;
   means for prompting a user of the first UE for a secure authentication input upon determining that the incoming call is a secure incoming call;
   wherein the means for receiving is further configured to receive the secure authentication input upon determining that the incoming call is a secure incoming call, wherein the secure authentication input indicates to the first UE to answer the secure incoming call;
   wherein the means for determining is further configured to determine whether the secure authentication input matches with authentication information upon receiving the secure authentication input, wherein the authentication information is obtained from the first UE, a user of the first UE, or the second UE; and
   means for answering the received secure incoming call that originated from the second UE when the received secure authentication input matches the authentication information.

15. The apparatus of claim 14, wherein the means for receiving is further configured to receive the authentication information from the second UE before receiving the secure incoming call from the second UE.

16. The apparatus of claim 14, further comprising:
means for obtaining the authentication information from a user of the first UE, said authentication information being obtained before receiving the secure incoming call;
means for storing the obtained authentication information in association with a caller identifier of the second UE, said authentication information being stored before receiving the secure incoming call;
wherein the means for determining is further configured to determine the caller identifier of the second UE upon receiving the secure incoming call; and
wherein the means for obtaining is further configured to obtain the stored authentication information associated with the determined caller identifier of the second UE.

17. The apparatus of claim 14, further comprising:
means for obtaining the authentication information from a user of the first UE, said authentication information being obtained before receiving the secure incoming call;
means for storing the obtained authentication information in association with a caller identifier of the second UE, said authentication information being stored before receiving the secure incoming call;
wherein the means for determining is further configured to determine the caller identifier of the second UE upon receiving the secure incoming call; and
wherein the means for obtaining is further configured to obtain the stored authentication information associated with the determined caller identifier of the second UE.

18. The apparatus of claim 14, wherein the means for determining is further configured to determine a caller identifier of the second UE upon receiving the secure incoming call, and wherein the apparatus further comprising means for sending, to an authentication information database, a request for the authentication information associated with the caller identifier of the second UE, the request including the caller identifier of the second UE.

19. The apparatus of claim 14,
wherein the means for determining is further configured to determine a caller identifier of the second UE upon receiving the secure incoming call;
wherein the apparatus further comprises means for sending the determined caller identifier and the received secure authentication input to an authentication information database; and
wherein the means for receiving is further configured to receive a response from the authentication information database indicating whether the received secure authentication input matches the authentication information.

20. The apparatus of claim 14, further comprising:
means for storing a time period in association with a caller identifier of the second UE, wherein said time period is stored before receiving the secure incoming call, and wherein the secure authentication input is prompted upon determining that a current time corresponds with the stored time period for the caller identifier of the second UE.

21. An apparatus for secure call answering, the apparatus being a first user equipment (UE) comprising:
a memory; and
at least one processor coupled to the memory and configured to:
receive an incoming call originated from a second UE;
determine whether the incoming call originated from the second UE is a secure incoming call;
prompt a user of the first UE for a secure authentication input upon determining that the incoming call is a secure incoming call;
receive the secure authentication input upon determining that the incoming call is a secure incoming call, wherein the secure authentication input indicates to the first UE to answer the secure incoming call;
determine whether the secure authentication input matches with authentication information upon receiving the secure authentication input, wherein the authentication information is obtained from the first UE, a user of the first UE, or the second UE; and
answer the received secure incoming call originated from the second UE when the received secure authentication input matches the authentication information.

22. The apparatus of claim 21, wherein the at least one processor is further configured to receive the authentication information from the second UE before receiving the secure incoming call from the second UE.

23. The apparatus of claim 21, wherein the at least one processor is further configured to:
obtain, before receiving the secure incoming call, the authentication information from a user of the first UE;
store, before receiving the secure incoming call, the obtained authentication information in association with a caller identifier of the second UE;
determine the caller identifier of the second UE upon receiving the secure incoming call; and
obtain the stored authentication information associated with the determined caller identifier of the second UE.

24. The apparatus of claim 21, wherein the at least one processor is further configured to:
determine a caller identifier of the second UE upon receiving the secure incoming call; and
send, to an authentication information database, a request for the authentication information associated with the caller identifier of the second UE, the request including the caller identifier of the second UE.

25. The apparatus of claim 21, wherein the at least one processor is further configured to:
determine a caller identifier of the second UE upon receiving the secure incoming call;
send the determined caller identifier and the received secure authentication input to an authentication information database; and
receive a response from the authentication information database indicating whether the received secure authentication input matches the authentication information.

26. The apparatus of claim 21, wherein the at least one processor is further configured to:
store, before receiving the secure incoming call, a time period in association with a caller identifier of the second UE, wherein the secure authentication input is prompted upon determining that a current time corresponds with the stored time period for the caller identifier of the second UE.

27. A computer-readable medium storing computer executable code of a first user equipment (UE), comprising code to:
receive an incoming call originated from a second UE;
determine whether the incoming call originated from the second UE is a secure incoming call;
prompt a user of the first UE for a secure authentication input upon determining that the incoming call is a secure incoming call;

receive the secure authentication input upon determining that the incoming call is a secure incoming call, wherein the secure authentication input indicates to the first UE to answer the secure incoming call;

determine whether the secure authentication input matches with authentication information upon receiving the secure authentication input, wherein the authentication information is obtained from the first UE, a user of the first UE, or the second UE; and answer the received secure incoming call originated from the second UE when the received secure authentication input matches the authentication information.

* * * * *